(12) United States Patent
Hailemariam et al.

(10) Patent No.: US 12,555,698 B2
(45) Date of Patent: Feb. 17, 2026

(54) GRIT BLASTING

(71) Applicant: DDP Specialty Electronic Materials US, LLC., Wilmington, DE (US)

(72) Inventors: Leaelaf Mengistu Hailemariam, Edina, MN (US); Katariina Majamaa, Helsinki (FI)

(73) Assignee: DDP SPECIALTY ELECTRONIC MATERIS US, LLC.

( * ) Notice: Subject to any disclaimer, the term of this patent is extended or adjusted under 35 U.S.C. 154(b) by 1204 days.

(21) Appl. No.: 16/979,412

(22) PCT Filed: Mar. 12, 2019

(86) PCT No.: PCT/US2019/021734
§ 371 (c)(1),
(2) Date: Sep. 9, 2020

(87) PCT Pub. No.: WO2019/190735
PCT Pub. Date: Oct. 3, 2019

(65) Prior Publication Data
US 2021/0082593 A1 Mar. 18, 2021

Related U.S. Application Data

(60) Provisional application No. 62/649,894, filed on Mar. 29, 2018.

(51) Int. Cl.
*G21F 9/30* (2006.01)
*B24C 1/08* (2006.01)
*G21F 9/00* (2006.01)
*G21F 9/12* (2006.01)

(52) U.S. Cl.
CPC .................. *G21F 9/30* (2013.01); *B24C 1/08* (2013.01); *G21F 9/005* (2013.01); *G21F 9/12* (2013.01)

(58) Field of Classification Search
CPC ... G21F 9/30; G21F 9/005; G21F 9/12; B24C 1/08; B24C 11/00
USPC ........................................................... 588/1
See application file for complete search history.

(56) References Cited

U.S. PATENT DOCUMENTS

| 4,088,563 A | 5/1978 | Marquardt |
| 6,147,274 A * | 11/2000 | Wood ..................... G21F 9/002 588/1 |
| 7,662,754 B2 | 2/2010 | Faure et al. |
| 2005/0230267 A1 | 10/2005 | Veatch et al. |
| 2013/0302224 A1* | 11/2013 | Denton ................. B01D 59/30 423/2 |
| 2016/0137532 A1 | 5/2016 | Slough et al. |

FOREIGN PATENT DOCUMENTS

| JP | S60165600 A | 8/1985 |
| JP | H0587983 A | 4/1993 |
| JP | 2009166207 | 7/2009 |
| RU | 2003105696 A | 9/2004 |
| RU | 2329555 C2 | 7/2008 |
| RU | 2333556 C2 | 9/2008 |
| WO | 0211152 A2 | 2/2002 |

OTHER PUBLICATIONS

Pitochelli ("Ion Exhange Catalysis and Matrix Effects," 1972) (Year: 1972).*
Pitochelli ("Ion Exhange Catalysis and Matrix Effects") (Year: 1972).*
PCT International Search Report, mailed May 24, 2019, for international application No. PCT/US2019/021734, filed Mar. 12, 2019; Authorized Officer, Kaveckaite, Ausra.
Higgins, Irwin R., and Mark S. Denton. "CSA continuous countercurrent ion exchange (CCIX) technology." Separation Science and Technology 22, No. 2-3 (1987): 997-1015.
Higgins, Irwin R. "Continuous ion exchange equipment adapted to water and dilute waste treatment." Industrial & Engineering Chemistry 53, No. 8 (1961): 635-637.
Jones, Kenneth C., and Randall A. Pyper. "Copper recovery from acidic leach liquors by continuous ion-exchange and electrowinning." JOM 31, No. 4 (1979): 19-25.
Martinola, F. "Ion exchangers and adsorbents—Versatile aids for the materials processing industry." Materials & Design 7, No. 1 (1986): 25-32.
Higgins, et al. "Chem-Seps Continuous Ion-exchange Contactor and its applications to de-mineralization processes." In Ion Exchange in the Process Industries, pp. 121-126. Society of Chemical Industry London, 1970.

* cited by examiner

*Primary Examiner* — Daniel C. Mccracken
*Assistant Examiner* — Starfari Teshawn Mcclain

(57) ABSTRACT

Provided is a process for blast cleaning comprising subjecting a work surface to a blast stream, wherein the work surface is metal that is contaminated with one or more radioactive moiety, wherein the blast stream comprises water and one or more resin particles.

14 Claims, No Drawings

GRIT BLASTING

It is often desired to decontaminate metal surfaces that have become contaminated with radioactive isotopes. For example, when a nuclear reactor is partially or fully decommissioned, it becomes desirable to remove radioactivity from metal parts. In particular, steel items that have been exposed to neutron radiation become contaminated with cobalt-60, and much of that contamination is located near the surface of the steel item. Previously known methods of decontamination have involved a wide variety of techniques, each of which has significant drawbacks, including, for example, the following: chemical or electrochemical methods that remove a layer from the work surface, which generates an undesirably large amount of secondary waste; mechanical methods involving washing or applying peelable coatings, which involve an undesirably large amount of intensive manual labor. A few decontamination techniques have been proposed but are not in wide use, such as, for example, methods involving microbes, microwaves, lasers, supercritical fluids, exothermic powders, or electrical heating of the work surface. Some decontamination methods involve either blasting with water or dry blasting with a mixture of an abrasive material such as zeolites and air. Blasting with water alone creates a large amount of contaminated water, creating a serious disposal problem. All dry blasting processes are known to create airborne dust problems.

JPH0587983 describes a method of removing radioactive material from a surface by blasting the surface with a mixture of zeolites and air. It is desired to provide a decontamination method that avoids the dust problems created by dry blasting and also reduces the contamination of water used in the decontamination process.

The following is a statement of the invention.

A first aspect of the present invention is a process for blast cleaning comprising subjecting a work surface to a blast stream, wherein the work surface is metal that is contaminated with one or more radioactive moiety, and wherein the blast stream comprises water and one or more resin particles.

The following is a detailed description of the invention.

As used herein, the following terms have the designated definitions, unless the context clearly indicates otherwise.

"Resin," as used herein is a synonym for "polymer," which is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer.

Vinyl monomers have the structure

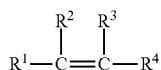

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers.

Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

Styrenic monomers are vinyl monomers in which each of $R^1$ and $R^2$ is hydrogen, $R^3$ is hydrogen or alkyl, and —$R^4$ has the structure

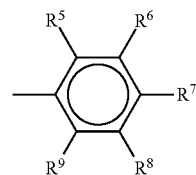

where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

Acrylic monomers are vinyl monomers in which each of $R^1$ and $R^2$ is hydrogen; $R^3$ is either hydrogen or methyl; and —$R^4$ has one of the following structures:

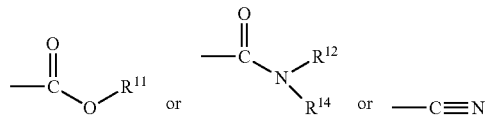

where each of $R^{11}$, $R^{12}$, and $R^{14}$ is, independently, hydrogen, a $C_1$ to $C_{14}$ alkyl group, or a substituted $C_1$ to $C_{14}$ alkyl group.

A resin having 90% or more by weight polymerized units of vinyl monomers is a vinyl resin. A resin having 80% or more by weight polymerized units of styrenic monomers is a styrenic resin. A resin having 55% or more by weight of polymerized units of acrylic monomers are acrylic resins. A resin is considered herein to be crosslinked if the resin contains 0.5% or more by weight polymerized units of multifunctional vinyl monomers. A crosslinked resin is considered herein to be "fully" crosslinked if in a typical sample of the crosslinked resin, 20% or less by weight of the resin is material that is soluble in any solvent.

As used herein, a "bead" is a solid particle at 25° C. A spherical bead is characterized by its diameter. A bead that is not spherical is considered to have the diameter equal to an imaginary sphere that has the same volume as the actual bead. A collection of beads is characterized by the volume-average diameter. A bead that contains 80% or more by weight resin is a resin bead. Resin beads may be macroporous beads or gel beads.

Macroporous resin beads have a porous structure with average pore diameter of 20 nm or larger. Pore diameter is measured using the Brunauer-Emmett-Teller (BET) method using nitrogen gas.

In gel resin beads, the pores are the free volumes between the atoms in the entangled, possibly crosslinked, polymer chains of the polymeric bead. The pores in gel type polymeric beads are smaller than 20 nm. In some cases, the pores in gel type resins are too small to be detected using the BET method.

As used herein, "ultrafiltration" (UF) refers to a process in which water that contains impurities is driven by a pressure gradient through a membrane that has permanent pores. The UF membrane is semi-permeable and blocks the passage of (i.e., retains) particles of diameter 50 nm or larger. Water, dissolved substances, and smaller particles pass through the UF membrane via the pores. Transmembrane pressure is typically 10 to 100 kilopascal (kPa) (1.45 to 14.5 psig).

As used herein, "reverse osmosis" (RO) is a process in which, like ultrafiltration, water that contains impurities is driven by a pressure gradient through a membrane. The RO membrane is semi-permeable but has no permanent pores. The RO membrane blocks the passage of all particles. Water passes through the RO membrane by diffusion through the membrane material. RO is typically very effective at retaining nearly all solutes, including monovalent ions.

As used herein, "ion exchange" is a process in which water that contains dissolved ions is passed through a fixed bed of ion exchange resin particles. The dissolved ions in the water are exchanged for ions of the same charge (that is, cations exchange for other cations, and anions exchange for other anions) that had been resident in the ion exchange resin particle. For example, dissolved cobalt cations present in the water may be exchanged for sodium ions that had been resident on the ion exchange resin, and then the water, after passing through the fixed bed of ion exchange resin particles, will have dissolved sodium ions in place of some or all of the original dissolved cobalt ions.

Steel is any one of a variety of alloys of iron and carbon. Other elements may also be present in steel, including, for example, manganese, nickel, chromium, molybdenum, boron, titanium, vanadium, tungsten, cobalt, and niobium. Iron is always 50% by weight or more of the composition of steel.

Ratios are described herein as follows. For example, if a ratio is said to be 3:1 or greater, that ratio may be 3:1 or 5:1 or 100:1 but may not be 2:1. The general statement of this idea is as follows: when a ratio is said herein to be X:1 or greater, it is meant that the ratio is Y:1, where Y is greater than or equal to X. Similarly, for example, if a ratio is said to be 15:1 or less, that ratio may be 15:1 or 10:1 or 0.1:1 but may not be 20:1. Stated in a general way: when a ratio is said herein to be W:1 or less, it is meant that the ratio is Z:1, where Z is less than or equal to W.

The present invention involves the use of a blast stream that contains both water and one or more resin particles. Preferably, the resin particles form a slurry, in which the resin particles are distributed throughout a continuous medium that contains water. Preferably the blast stream has pH of 6 or lower; more preferably 5 or lower; more preferably 4 or lower; more preferably 3 or lower. Preferably the blast stream has pH of 0 or higher; more preferably 1 or higher.

Preferably, the amount of resin particles, by weight based on the total weight of water and resin particles, is 2% or more; more preferably 5% or more; more preferably 8% or more. Preferably, the amount of resin particles, by weight based on the total weight of water and resin particles, is 45% or less; more preferably 35% or less.

Preferably, the resin particles have volume-average diameter of 100 μm or larger; more preferable 200 μm or larger; more preferably 400 μm or larger. Preferably, the resin particles have volume-average diameter of 2000 μm or smaller; more preferably 1000 μm or smaller.

Preferred resins are vinyl resins; more preferred are acrylic resins and styrenic resins; more preferred are styrenic resins. Preferably the amount of polymerized units of styrenic monomers is, by weight based on the weight of the resin, 90% or more; more preferably 95% or more.

Preferably the resin is crosslinked; more preferably the resin is fully crosslinked. Preferably, the amount of polymerized units of multifunctional vinyl monomer in the resin is, by weight based on the weight of the resin, 2% or more; more preferably 4% or more. Preferably, the amount of polymerized units of multifunctional vinyl monomer in the resin is, by weight based on the weight of the resin, 15% or less; more preferably 10% or less.

The resin may or may not contain covalently bound functional groups. A functional group is any chemical group that contains an atom other than hydrogen or carbon, except that the ester linkage in an ester of acrylic acid or methacrylic acid is not considered a functional group. Functional groups may be in neutral form or ionic form.

Preferably, the resin contains covalently bound functional groups selected from sulfonic groups, carboxylic groups, secondary amine groups (including secondary amine groups in which one or more carbon atom attached to the nitrogen atom is part of an alkyl group substituted with a phosphonic group), tertiary amine groups, and quaternary ammonium groups (including quaternary amine groups in which one or more of the carbon atoms attached to the nitrogen atom is part of a hydroxyalkyl group). More preferably, the resin contains covalently bound functional groups selected from sulfonic groups, carboxylic groups, secondary amine groups in which each carbon atom attached to the nitrogen (except for the carbon atom that is part of the polymer chain of the resin) is part of an unsubstituted alkyl group, tertiary amine groups in which each carbon atom attached to the nitrogen (except for the carbon atom that is part of the polymer chain of the resin) is part of an unsubstituted alkyl group, and secondary amine groups in which one or more carbon atoms attached to the nitrogen atom is part of an alkyl group substituted with a phosphonic group.

Mixtures of suitable and preferred resins are also suitable and preferred.

The blast cleaning process involves bringing the blast stream into contact with a work surface. Preferably the blast stream is propelled at the work surface. The blast stream may be propelled in any manner. For example, a mixture of water and resin particles may be mixed with a stream of compressed air to form a mixed stream and then directing that mixed stream at the work surface. For another example, the mixture of water and resin particles may be propelled by a pump.

When air is mixed with the slurry, preferred ratio of air to slurry is 0.05:1 or higher; more preferably 0.10:1 or higher. When air is mixed with the slurry, preferred ratio of air to slurry is 0.5:1 or less; more preferably 0.3:1 or less.

Preferably, the blast stream, whether or not it contains compressed air, is forced through a nozzle to produce a stream, which is directed at the work surface. Preferably, the pressure of the blast stream in the inside of the nozzle is 1 megapascal (MPa) (145 psi) or higher; more preferably 2 MPa (290 psi) or higher; more preferably 3 MPa (435 psi) or higher. Preferably, the pressure of the blast stream in the inside of the nozzle is 7 MPa (1015 psi) or lower.

Preferably, the blast stream is at temperature of 0° C. or higher; more preferably 10° C. or higher; more preferably 15° C. or higher; more preferably 18° C. or higher. Preferably the blast stream is at temperature of 35° C. or lower; more preferably 30° C. or lower.

The work surface is the surface of an article. Preferably the article is made of steel. Preferably the article contains one or more radioactive isotope; more preferably the article contains one or more radioactive isotope of chromium, nickel, or cobalt; more preferably the article contains cobalt-60 (also written as $^{60}$Co). Preferred articles are currently or formerly parts of a nuclear power plant that have been exposed to neutron radiation.

After the work surface has been contacted by the blast stream, the blast stream is herein referred to as "spent." The term "spent blast stream" herein refers to the blast stream and the material removed from the work surface by the blasting process. The material removed from the work surface is preferably recovered from the spent blast stream.

Preferably, the spent blast stream is subjected to separation processes such as, for example, filtration and/or other processes, to separate the water from the resin particles, other solid materials, and dissolved contaminants. It is contemplated that the water thus separated from the various contaminants will be sufficiently pure to be used in industrial processes, such as, for example, serving as the water used in the blast stream of the present invention.

It is also contemplated that after water removal, the waste solids (including resin particles and other solid materials, including compounds that had been dissolved in the water of the blast stream) will contain the radioactive waste that was removed from the work surface, and that the waste solids will then be sufficiently concentrated that they can be disposed of in a reasonable way.

It is contemplated that one of the advantages of the present invention is that, when radioactive work surfaces are cleaned, the removed radioactive materials will tend to attach to the solid particles in the blast stream (i.e., the resin particles) rather than remain in the water, to a greater extent that in previously-known methods. Thus it is expected that the radioactive waste will be largely concentrated in a solid form, which presents less of a disposal problem that does water that is contaminated with radioactivity.

The following are examples of the present invention.

The operation of exposing a metal surface containing radioactive cobalt to a blast stream was mimicked by using a model system as follows. A stirring paddle was fabricated from high-cobalt alloy, and the paddle was rotated in a slurry of water and resin beads. A rectangular coupon of the same alloy was also placed as a baffle in the stirred slurry. The ability of the process to remove cobalt from the metal, and the preference for the cobalt to locate in the resin beads instead of in the water was measured.

The water used in these Examples was MILLI-Q™ water from the Millipore Corporation. This water is highly purified, having resistivity of 10 megaohm*cm at 25° C.

The metal sample was HAYNES™ 188 alloy from Haynes International, which has the following composition:

| Element | Co | Ni | Cr | W | Fe | Mn | Si | C | La | B |
|---|---|---|---|---|---|---|---|---|---|---|
| wt % | 39 balance | 22 | 22 | 14 | 3 max | 1.25 max | 0.35 | 0.10 | 0.03 | 0.015 max |

Agitated flask testing using approximately 1500 grams of a 10 wt. % aqueous slurry of various particle types was carried out after adjusting the solutions to pH 2.1 with HCl. Mechanical stirring was set for 500 rpm using a HAYNES® 188 alloy (UNS R30188) stir paddle. In addition, a baffle containing a HAYNES® 188 alloy coupon was placed into each flask. After 24 hrs, at 25° C., aliquots of the test waters and the particles ("test resins") were removed and measured for metal content using inductively coupled plasma mass spectrometry (ICP-MS). Also, control resins (not used in any testing) were studied by ICP-MS.

ICP-MS was conducted as follows. The elemental concentration (ng/g) of three sample preparations of each resin, both tested and control resins) was determined after MW digestion by ICP-Mass Spec. and fitting to a calibration curve. Approximately 0.25 g of each resin was digested in nitric acid using the Milestone MW. Final samples were prepared by bringing the total wt. to 20 g with water (an 80-fold sample dilution) and filtering with a 0.2 mM filter. For these samples, the calibration matrix consisted of HCl. The parameters of the ICP procedure were as follows:

ICP Parameters

| | |
|---|---|
| Sample Prep | MW Acid Digestion: 0.25 g of sample; 4 mls HNO$_3$ and 1 ml water; brought to a final wt. of 20 g with MQ water and filtering with a 0.2 uM filter. Water samples measured as is after filtering. |
| Dilution Factor | Resins: Approximately 80x for Resin Beads Water: No dilution required |
| Calibration Curve | 0, 1, 5, 10, 20 and 50 ng/g for the elements Co, Cr, Fe, Ni and W Resin standards where prepared in a HNO3 matrix. Water standards were prepared in an HCl matrix. |
| Standards | 3, 5, and 10 ppm multi element stock solutions |
| Instrument | AGILENT ™ 7500CE ICP - Mass Spectrometry instrument |
| Limit of Detection | 3 times the STDEV of 9 zero calibrators, divided by the slope of the elemental calibration curve, times the dilution factor |

The table below shows the concentration (nanograms of specific element per gram of water or resin, ng/g) of the specific isotopes of the elements of interest found in the test waters, control resins, and the test resins.

The particle types studied were sand and five ion exchange resins as follows. All five ion exchange resins are fully crosslinked. All were made as styrene/divinylbenzene copolymers and then reacted with various reagents to attach the functional groups shown. All are products of the Dow Chemical Company. Resins were either gel resins or macroporous (MP) resins. "nt" is not tested. "<LOD" means below the level of detection.

| Resin | Resin Commercial Name | Functional Group | form |
|---|---|---|---|
| IRC | AMBERLITE ™ IRC747 | aminophosphonic | MP |
| WBA | AMBERLYST ™ A21 | non-quaternary amine | MP |
| SAC1 | AMBERLYST ™ 16Wet | sulfonic | MP |
| SAC2 | DOWEX ™ MARATHON ™ C | sulfonic | gel |
| SBA | AMBERSEP ™ 900 OH | quaternary ammonium | MP |

The results were as follows:

| | $^{53}$Cr (ng/g) | | | | | |
|---|---|---|---|---|---|---|
| Particle: | IRC | WBA | SAC1 | SAC2 | SBA | sand |
| water | 2.7 | 5.3 | 9.7 | 2.6 | 51.1 | 33.1 |
| control resin | 391 | 89 | 62 | 852 | 934 | nt |
| test resin | 877 | 190 | 1427 | 1112 | 620 | nt |

| | $^{59}Co$ (ng/g) | | | | | |
|---|---|---|---|---|---|---|
| Particle: | IRC | WBA | SAC1 | SAC2 | SBA | sand |
| water | 0.0 | 10.7 | 0.1 | 0.0 | 0.9 | 58.6 |
| control resin | 10.5 | 7.6 | 4.3 | 6.1 | 7.0 | nt |
| test resin | 36.6 | 26.1 | 32.3 | 18.8 | 5.3 | nt |

| | $^{60}Ni$ (ng/g) | | | | | |
|---|---|---|---|---|---|---|
| Particle: | IRC | WBA | SAC1 | SAC2 | SBA | sand |
| water | 4.1 | 21.6 | <LOD | 0.3 | 37.5 | 58.6 |
| control resin | 354 | <LOD | <LOD | 536 | 263 | nt |
| test resin | 839 | 98.5 | 109.1 | 857 | 89.2 | nt |

With the exception of the SBA resin, the elements Co, Cr, Ni and to some extent W are found in a greater quantity in the test resins than in the test water or control resins. Therefore the resins were capable of removing and retaining these elements. For example, the test resin acquired a significant amount of cobalt-59 from the alloy, and the amount of cobalt-59 that remained in the water was relatively low, when any of the resins IRC, WBA, SAC1, or SAC2 was used. It is contemplated that these resins would also be effective at removing and retaining cobalt-60 that had been removed from steel during a blasting process.

The invention claimed is:

1. A process for blast cleaning comprising contacting a work surface with a blast stream,
    wherein the work surface is metal that is contaminated with one or more radioactive moiety,
    wherein the blast stream comprises water and one or more resin particles,
    wherein the resin is an ion exchange resin that is cross-linked,
    wherein the blast stream is propelled at the work surface, and
    wherein at least a part of the radioactive moieties is removed from the work surface and attached to the particles of ion exchange resin.

2. The process of claim 1, wherein the metal is steel.

3. The process of claim 1, wherein the radioactive moiety comprises one or more radioisotope of cobalt, nickel, or chromium.

4. The process of claim 1, wherein the radioactive moiety comprises $^{60}Co$.

5. The process of claim 1, wherein the resin particles comprise styrenic resin.

6. The process of claim 1, wherein the resin particles comprise particles of one or more ion exchange resin selected from the group consisting of ion exchange resins having covalently bound sulfonic groups;
    ion exchange resins having covalently bound carboxylic groups;
    ion exchange resins having covalently bound secondary amine groups;
    ion exchange resins having covalently bound tertiary amine groups;
    ion exchange resins having covalently bound quaternary ammonium groups;
    and mixtures thereof.

7. The process of claim 1, wherein the pH of the blast stream is 4 or lower.

8. The process of claim 1, wherein the blast stream has a temperature of 15° C. to 35° C.

9. The process of claim 1, wherein the ion exchange resin comprises from 2 to 15% of polymerized units of multi-functional vinyl monomer, by weight based on the weight of the resin.

10. The process of claim 1, wherein the ion exchange resin is fully crosslinked.

11. The process of claim 1, wherein the blast stream is forced through a nozzle, and the pressure of the blast stream in the inside of the nozzle is 1 megapascal or higher.

12. The process of claim 1, wherein the blast stream is propelled by a pump.

13. The process of claim 1, wherein the blast stream is combined with a stream of compressed air to form a mixed stream.

14. The process of claim 13, wherein the blast stream is a slurry, and wherein ratio of air to slurry is 0.05:1 or higher.

* * * * *